(12) United States Patent
Sherer

(10) Patent No.: US 8,316,626 B2
(45) Date of Patent: Nov. 27, 2012

(54) PROTECTIVE GARMENT FOR LIVESTOCK

(76) Inventor: Ross Sherer, Yucaipa, CA (US)

( * ) Notice: Subject to any disclaimer, the term of this patent is extended or adjusted under 35 U.S.C. 154(b) by 0 days.

(21) Appl. No.: 12/194,891

(22) Filed: Aug. 20, 2008

(65) Prior Publication Data

US 2010/0043724 A1 Feb. 25, 2010

(51) Int. Cl.
 B68C 5/00 (2006.01)
 A01K 13/00 (2006.01)
(52) U.S. Cl. .................. 54/79.2; 119/850
(58) Field of Classification Search .......... 119/850, 119/856, 863; 54/79.1–79.4
 See application file for complete search history.

(56) References Cited

U.S. PATENT DOCUMENTS

| | | | | |
|---|---|---|---|---|
| 295,712 | A * | 3/1884 | Anderson | 54/80.1 |
| 438,105 | A | 10/1890 | Geyer | |
| 601,974 | A | 5/1898 | Meissner | |
| 2,253,837 | A | 8/1941 | Augspurger | |
| 2,443,831 | A * | 6/1948 | Miller | 54/79.1 |
| 3,209,517 | A | 10/1965 | Hyman | |
| 4,791,777 | A | 12/1988 | Sacane | |
| 5,076,043 | A * | 12/1991 | Butler | 119/850 |
| 5,341,765 | A | 8/1994 | McComb | |
| 5,458,094 | A * | 10/1995 | Proshan | 119/850 |
| D375,586 | S | 11/1996 | Caditz | |
| 5,676,094 | A | 10/1997 | Gun-Munro | |
| 5,676,095 | A * | 10/1997 | Ralls | 119/850 |
| 6,151,873 | A | 11/2000 | Rogers | |
| 6,240,882 | B1 * | 6/2001 | Gross | 119/850 |
| 6,499,438 | B1 | 12/2002 | Torres | |
| 6,508,205 | B1 | 1/2003 | Zink | |
| 6,883,466 | B1 | 4/2005 | Chambers | |
| 6,918,236 | B2 | 7/2005 | Springs | |
| 2004/0055543 | A1 | 3/2004 | Clement | |
| 2008/0022945 | A1 * | 1/2008 | Hughes et al. | 119/850 |
| 2008/0173258 | A1 * | 7/2008 | Franco | 119/850 |
| 2009/0173290 | A1 * | 7/2009 | Freitag | 119/850 |

FOREIGN PATENT DOCUMENTS

FR 2879586 12/2004

* cited by examiner

Primary Examiner — Son T Nguyen
(74) Attorney, Agent, or Firm — Knobbe, Martens, Olson & Bear, LLP

(57) ABSTRACT

A protective garment for livestock, such as a horse, has a first portion and a second portion defining a planar sheet of material. The first portion substantially covers a left leg and shoulder of the livestock, while the second portion substantially covers a right leg and shoulder of the livestock. The garment can comprise a one-piece protective cover or a two-piece protective cover. In one embodiment, the first portion and the second portion are connected to each other by an attachment member extending across a back of the livestock. In use, the protective garment is sufficiently secured to the livestock to protect it from undesirable external elements, such as insects and sunlight, yet somewhat loose to allow the livestock to freely move while wearing the garment.

10 Claims, 14 Drawing Sheets

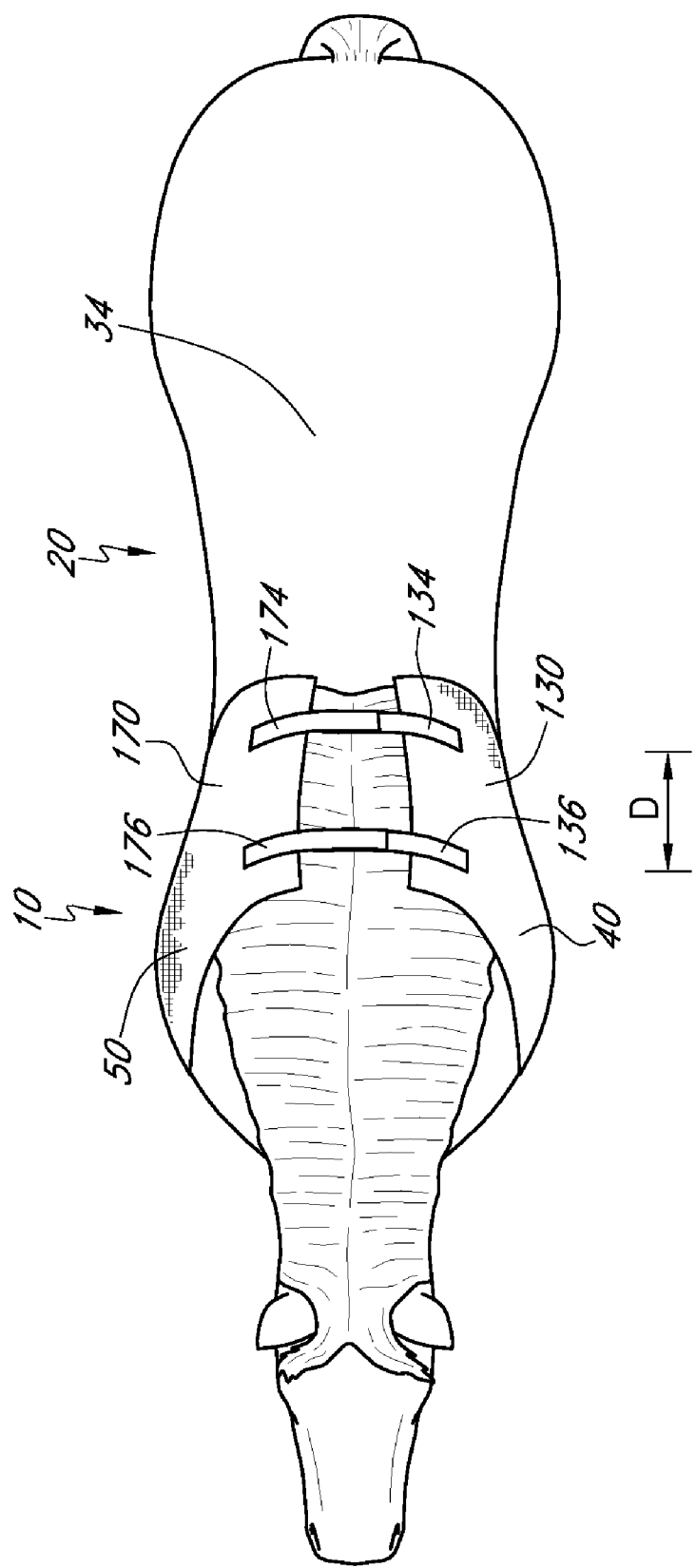

PROTECTIVE GARMENT FOR LIVESTOCK

BACKGROUND

1. Field of the Inventions

The embodiments disclosed herein are directed generally to devices and methods for protecting livestock. In particular, the described embodiments relate to a protective garment for livestock, such as horses, to protect livestock from undesirable external elements, including insects and sunlight.

2. Description of Related Art

Some livestock are grazing and working animals and naturally spend much of their time outside. Horses, for example, typically spend time outside grazing, working, training, or being ridden by a rider. Even horses that primarily live in shelter structure, such as a stable or barn, are often exposed to external elements, such as insects and sunlight, when removed from the shelter or, in some cases, within the shelter itself. Accordingly, livestock, such as horses, are often exposed to external elements to which livestock are for the most part unprotected from.

Insects pose a nuisance and, in some cases, a health threat to livestock. Stable and house flies are some of the most common types of insects that are attracted to horses. The stable fly, for instance, attaches to a horse's skin often on the front legs of the horse or about its shoulders, and feeds on the horse's blood. Ticks and mosquitoes also pose a considerable threat to horses. Ticks spread Lyme disease and other maladies, while mosquitoes transmit West Nile Virus and equine encephalitis.

In addition, horses are exposed to other undesirable elements, such as harmful direct sunlight. Horses, like humans, can be inflicted with sunburn if exposed to the sun for a sufficient period of time. Equine sunburn is particularly problematic on sensitive areas of a horse and on light-haired horses, such as Appaloosas, Paints, and Pintos. Equine sunburn causes swelling, blisters, hair loss, and, in extreme cases, colic or liver damage. Hairless patches of a horse, including skin covering the shoulder blades, are particularly susceptible to sunburn. Moreover, some horses exhibiting photosensitization may develop an extremely negative reaction to sunlight, which would otherwise be benign in ordinary horses.

Insecticides are used to repel certain insects. However, insecticides have several drawbacks. For example, chemicals present in some insecticides harm a horse or other livestock if the chemicals seep into a food or water supply. In addition, application and reapplication of insecticides can be cumbersome for one who cares for horses. Furthermore, pesticides generally do not protect livestock from other damaging elements, such as harmful direct sunlight.

Known garments for livestock also have considerable limitations. For instance, existing protective garments, such as leg coverings, only protect the lower portion of a horse's leg. Protection from the fetock (i.e., ankle) to the carpus (i.e., knee) only covers the cannon bone (i.e., shin) area of a horse's leg. Horses move naturally with four basic gaits: the walk, the trot, the canter, and the gallop. Therefore, leg coverings should not impede the ability of a horse to walk, trot, canter, or gallop.

Further, as mentioned above, the typical covering for horses only covers the lower part of the horse's leg. Unfortunately, the hide on horses higher up towards the shoulder is also particularly sensitive to insect bites and the like. A horse's skin about the shoulder is often less thick than cattle hide, which means that horses are even more susceptible to insect bites on locations other than the horse's leg. Thus, existing leg coverings for horses are generally ineffective at preventing insect bites in these sensitive locations.

SUMMARY

Accordingly, it is an object of one or more of the embodiments disclosed herein to provide a protective garment for livestock that protects, for example, a horse from undesirable external elements, such as insects and direct sunlight. Furthermore, it as an object of at least one embodiment to provide a horse garment that is relatively easy to attach to and detach from a horse. It is also an object of at least one embodiment to provide a horse garment that, when secured to the horse, will allow a horse to move freely while walking, trotting, cantering, and galloping, yet still allow the horse garment to sufficiently cover the horse to protect the horse from undesirable external elements.

In one aspect of the embodiments disclosed herein, a garment for a horse to protect the horse from external elements is provided. The garment comprises a first portion, a second portion, and an attachment member. The first portion has a lower portion and an upper portion. The lower portion of the first portion is configured to cover substantially all of a leg of the horse, while the upper portion is configured to cover at least a portion of a shoulder of the horse. Similarly, the second portion has a lower portion and an upper portion. The lower portion of the second portion is configured to cover substantially all of a leg of the horse, while the upper portion is configured to cover at least a portion of a shoulder of the horse. The attachment member has a first end and a second end. The first end of the attachment member is attached to the first portion and the second end is attached to the second portion. In this particular aspect, the attachment member connects the first portion to the second portion.

In another aspect, the disclosed embodiments include a protective garment for livestock. The garment comprises a planar sheet of material configured to substantially cover a leg and a shoulder of a livestock. A first portion of the planar sheet is configured to attach to and detach from a second portion of the planar sheet. Such a configuration facilitates dressing the livestock with the planar sheet and removing the sheet from the livestock.

In another aspect, a method for protecting a horse from undesirable external elements is provided. The method comprises covering a portion of the horse with a substantially planar sheet of material. The sheet substantially covers a leg and a shoulder of the horse to protect the horse from undesirable external elements.

BRIEF DESCRIPTION OF DRAWINGS

These and other features, aspects, and advantages of the present protective garments for livestock will now be described in connection with contemplated embodiments, some of which are shown in the accompanying drawings. The illustrated embodiments, however, are merely examples and are not intended to limit the present protective garments. The drawings include the following figures.

FIG. 7 is a top plan view of a horse wearing an embodiment of a protective garment showing an attachment member disposed across a portion of a back of the horse.

DETAILED DESCRIPTION

Figure 8:
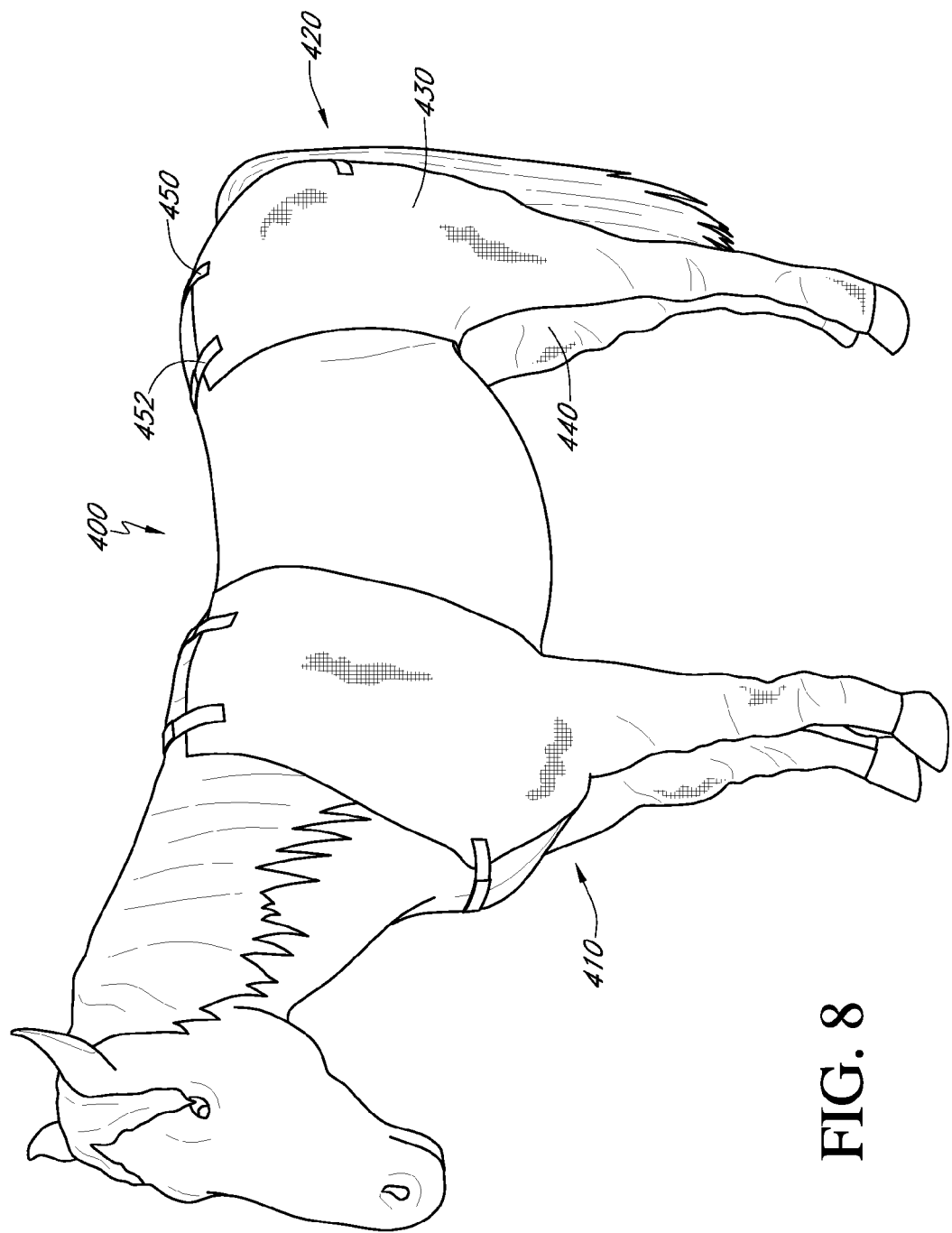
FIG. 8 is a perspective view of another embodiment of a protective garment for livestock, which shows a horse wearing the protective garment on both a front portion and a rear portion of the horse's body.

Embodiments of the present garment for livestock will be described hereinafter in detail with reference to the accompanying drawings. The structure of embodiments will be described first with reference to FIGS. 1 through 3. A method for attaching a protective garment to livestock will be described in connection with FIGS. 4A through 4C. FIGS. 5 through 7 illustrate different views of a horse wearing embodiments of a protective garment. With reference to FIG. 8, an embodiment of a protective garment for covering both a front portion and a rear portion of livestock will be described.

In many of the embodiments explicitly disclosed herein, the protective garments are described in connection with sheltering horses from undesirable external elements, such as, for example, insects and sunlight. It should be noted, however, that the protective garments described herein can be used with a variety of livestock, such as, but not limited to, cattle, donkeys, goats, mules, pigs, and sheep. Livestock is defined herein broadly as any breed or population of animal kept by humans for some useful, commercial purpose, which includes domestic, semi-domestic, and captive wild animals. In addition, embodiments of the protective garment disclosed herein are described as a one-piece cover and a two-piece cover. Additional configurations, however, are contemplated such as three-piece covers, four-piece covers, or other types of covers.

Figure 1:
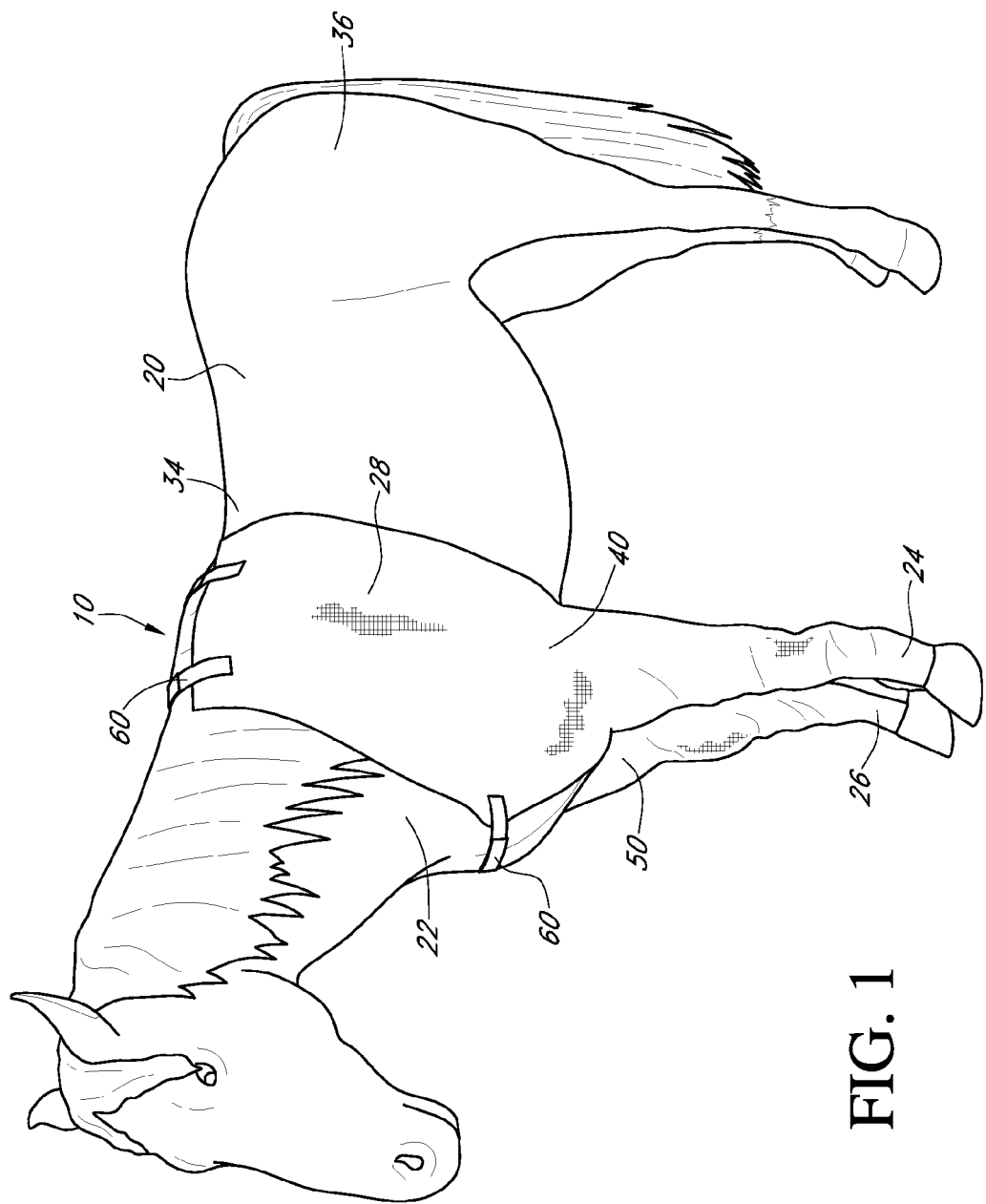
FIG. 1 is a perspective view of one embodiment of a protective garment for livestock, which shows a horse wearing the protective garment on a front portion of the horse's body.

FIG. 1 illustrates one embodiment of a wearable garment for protecting livestock from insects, sunlight, and other undesirable external elements. A horse 20 is shown wearing a protective garment 10. The garment 10 comprises a first protective cover 40 and a second protective cover 50. The first protective cover 40 and the second protective cover 50 each define a planar sheet of material, such as a lightweight mesh material, that is wrapped about and secured to the horse 20. An attachment member 60 extends from the first cover 40 to the second cover 50 to connect the first cover 40 to the second cover 50 and to secure the protective garment 10 to the horse 20.

In the illustrated embodiment, the garment 10 is disposed about a front portion 22 of the horse 20. Specifically, the wearable garment 10 covers and protects a front left leg 24 and a front right leg 26 of the horse 20. The garment 10 also extends over at least a portion of a front left shoulder 28 and a front right shoulder (which is hidden at least partially behind the front left shoulder 28) of the horse 20. In one embodiment, the attachment member 60 extends across a portion of a back 34 of the horse 20. In other embodiments, the garment 10 might be disposed about a rear portion 36 of the horse instead of a front portion 22 of the horse 20, the garment 10 might be disposed about both a rear portion 36 and a front portion 22 of the horse 20 (such as, for example, in an embodiment shown in FIG. 8), or the garment 10 might be disposed about one leg of the horse 20 instead of about two or more legs of the horse 20. In addition, in alternative embodiments, the garment 10 could comprise a single planar sheet of protective material, as opposed to two or more planar sheets of material. In some alternative embodiments, the garment might not include an attachment member 60 or any similar fastener.

In one embodiment, the protective garment 10 comprises an openwork fabric, such as a lightweight mesh material. For example, the garment 10 could be composed of burlap, Hessian cloth, or canvas material. A lightweight mesh material is advantageous because such a material is breathable and allows some air to flow between a livestock's outer surface and ambient air. The mesh material preferably is durable enough to withstand outdoor conditions typically experienced by livestock, yet flexible enough so as to not impair natural movements and motion of livestock. The protective garment 10, however, can comprise a wide variety of materials. For example, in other embodiments, the garment 10 might be made at least partially of cloth, such as cotton, flax or wool, denim, nylon, and/or natural fibers. In other embodiments the garment 10 might comprise, at least in part, a paper, rubber, or plastic material.

Figure 2A:
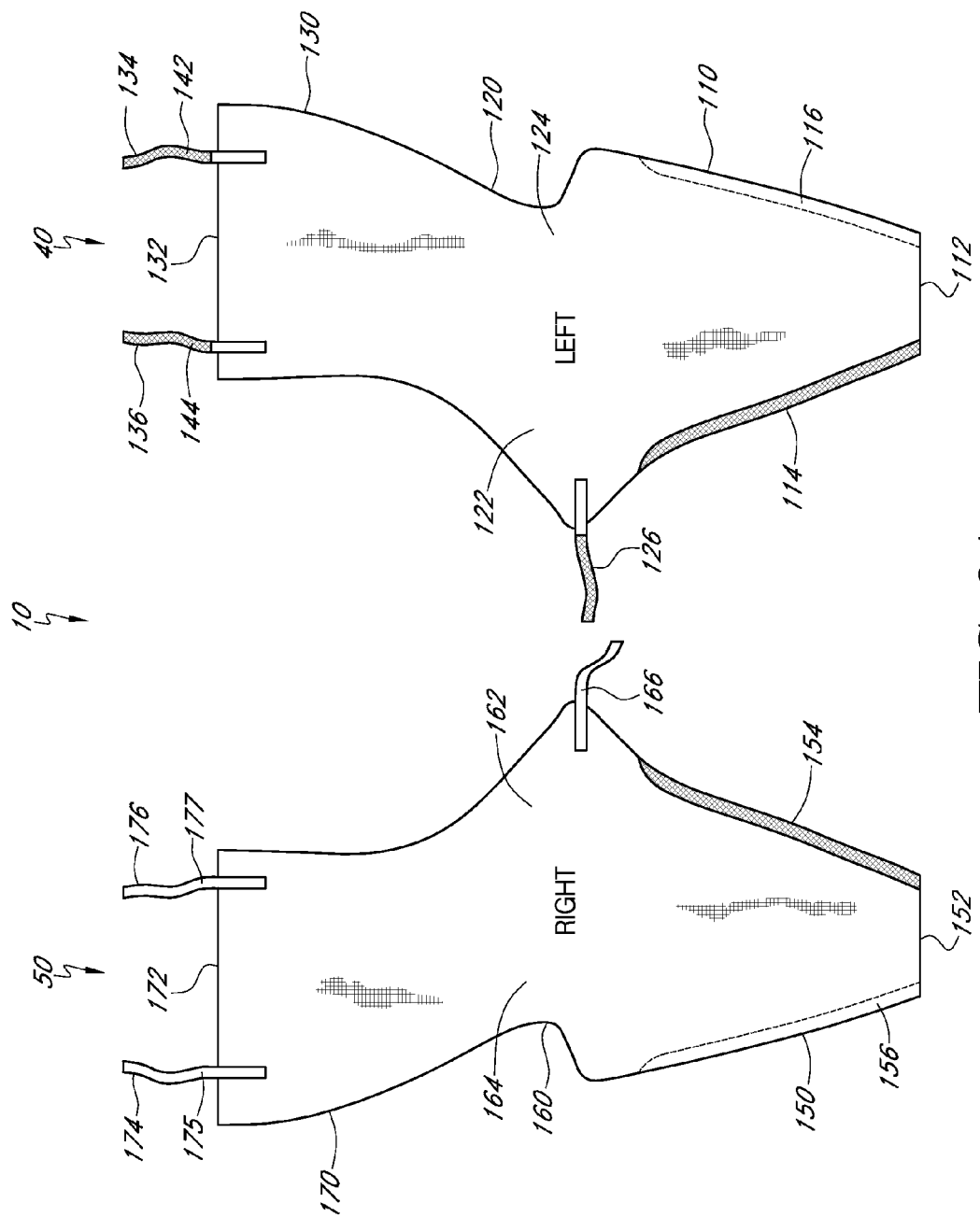
FIG. 2A is a top plan view of an embodiment of a protective garment having a first protective cover and a second protective cover as shown in FIG. 1.
Figure 2B:
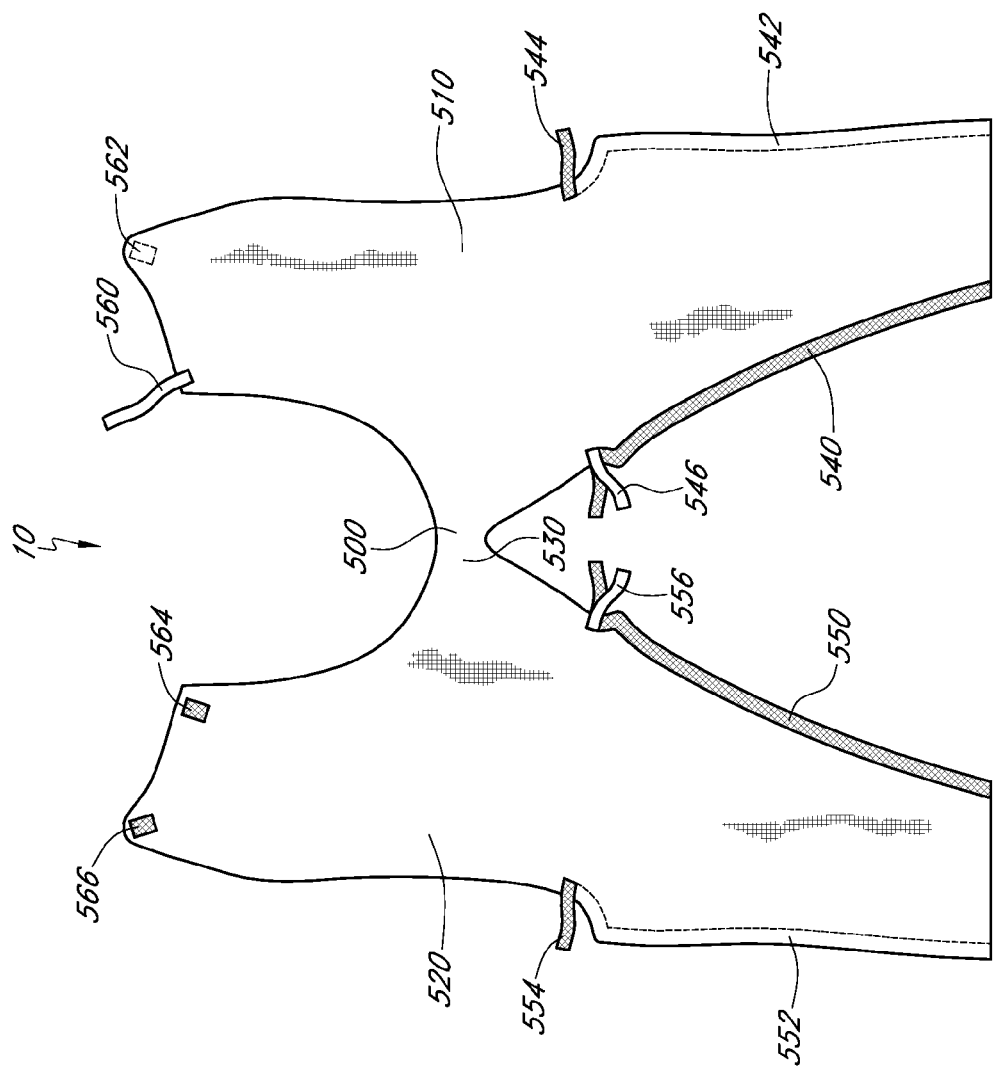
FIG. 2B is a top plan view of another embodiment of a protective garment.
Figure 3A:
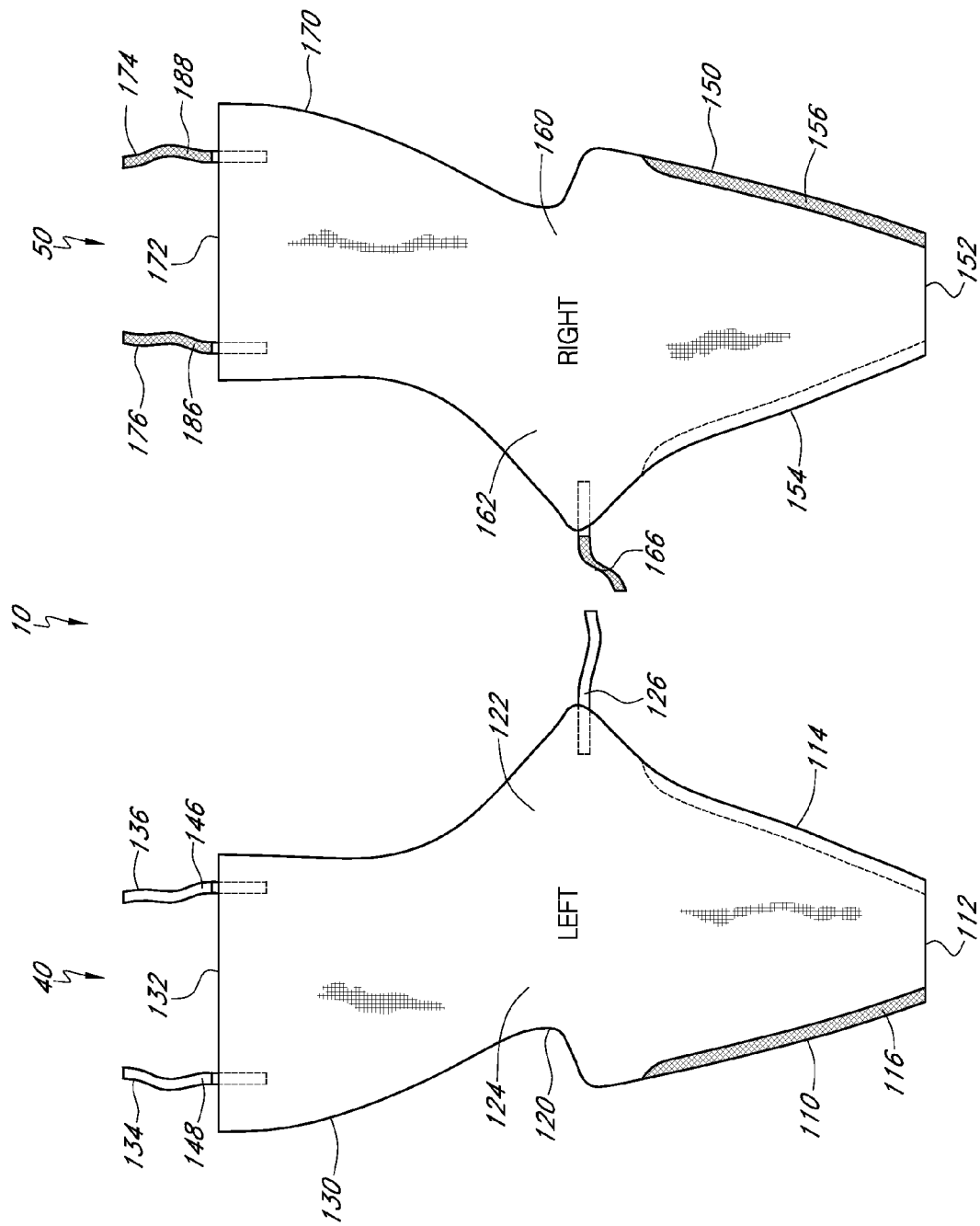
FIG. 3A is a bottom view of an embodiment of a protective garment having a first protective cover and a second protective cover as shown in FIG. 1.
Figure 3B:
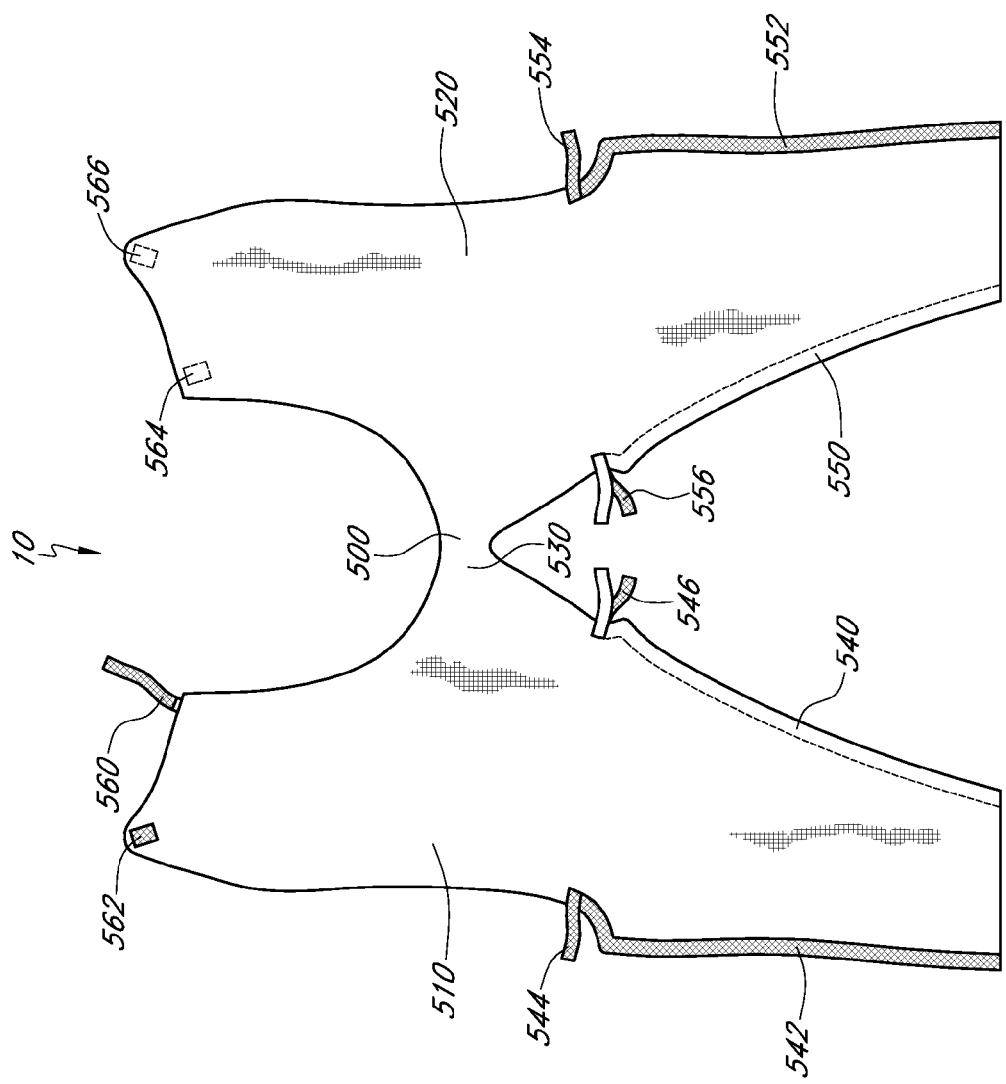
FIG. 3B is a bottom view of an embodiment of a protective cover as shown in FIG. 2B.

FIGS. 2 and 3 show a top plan view and a bottom view, respectively, of embodiments of the protective garment 10. One embodiment of the protective garment 10 is illustrated in FIGS. 2A and 3A, while another embodiment is illustrated in FIGS. 2B and 3B.

With reference to FIGS. 2A and 3A, in one embodiment, a garment 10 for protecting livestock comprises a two-piece protective cover that includes a first protective cover 40 and a second protective cover 50, each defining planar sheets of material. In the illustrated embodiment, the first cover 40 is configured to cover a left leg of livestock, while the second cover 50 is configured to cover a right leg of livestock. For purposes of clarification, and without limiting any description contained herein, the first protective cover 40 is identified as a "LEFT" garment and the second protective cover 50 is identified as a "RIGHT" garment in FIGS. 2A and 3A. Accordingly, the first cover 40 is disposed to the right of the second cover 50 in the top view of FIG. 2A, whereas the first cover 40 is disposed to the left of the second cover 50 in the bottom view of FIG. 3A.

In one embodiment, the first protective cover 40 has a lower portion 110, a central portion 120, and an upper portion 130. The lower portion 110 generally defines a tapered sheet for substantially covering a leg of livestock, such as a horse. The lower portion 110 has a cuff 112 defining a lower end of the first protective cover 40. The lower portion 110 generally tapers inward from a central portion 120 of the first cover 40 to the cuff 112. The cuff 112 is configured to be secured to livestock near or about a hoof or foot of the livestock.

A first edge 114 and a second edge 116 extend upward, and at least partially outward, from the cuff 112 and terminate near the central portion 120 of the first cover 40 or planar sheet. In one embodiment, the edges 114, 116 are substantially linear. In another embodiment, the first edge 114 comprises an elongated strip of loop material, and the second edge 116 comprises a complementary elongated strip of fastener material. As described in more detail below with reference to FIGS. 4A and 4B, the second edge 116 of fastener material can be attached to and detached from the first edge 114 of hook material. Advantageously, such an arrangement allows one to easily dress a livestock with the first protective cover 40 by simply wrapping the lower portion 110 of the planar sheet 40 about a leg of the livestock and fastening the second edge 116 to the first edge 114.

The central portion 120 of the cover 40 has an extending segment 122 and an indenting segment 124. The extending segment 122 protrudes outward from the central portion 120 and defines an area of material disposed at least partially beyond a line extending outward and upward defined by the first edge 114 of the lower portion 110. The extending segment 122 preferably is configured to cover at least a portion of an underbody of a horse 10, for example, and at least a portion of a front section of the horse 10 between a forearm and an upper front point of a shoulder. In one embodiment, an elongated strap 126 is attached to and extends outward from the extending segment 122 of the central portion 120 of the first cover 40. The elongated strap 126 is arranged to receive a complementary strap on the second protective cover 50 (as discussed below) to fasten the covers 40, 50 to each other and to secure the covers 40, 50 to a front portion of the horse 10. The indenting segment 124 of the central portion 120 is configured to define a recess so that the lower portion 110 can securely attach to a livestock's leg and the upper portion 130 can naturally extend from about an upper leg portion, across a shoulder, and to a back of the livestock.

The upper portion 130 of the first protective cover 40 comprises a planar sheet of material defining, in one non-limiting embodiment, a substantially quadrilateral configuration. The upper portion 130 extends from the central portion 120 to preferably cover at least a portion of a livestock's shoulder. In one embodiment, the upper portion 130 is configured to extend across a portion of a back of the livestock. The upper portion 130 has a terminal end 132. The terminal end 132, in one embodiment, includes a first strap 134 and a second strap 136. The first strap 134 and the second strap 136 each comprise an elongated band having an outer surface 142, 144 and an inner surface 146, 148 (the inner surfaces are shown in FIG. 3). In one embodiment, the outer surfaces 142, 144 each comprise a band of loop material for mating with corresponding straps having surfaces defining a hook material on the second protective cover 50. It will be appreciated that one of a plurality of straps can be used at this location as well as one or more continuous hook and loop fasteners to secure the terminal ends 132, 172 (terminal end 172 of the second cover 50 is described below) of the protective covers 40, 50 together in the manner that will be described below.

Continuing with reference to FIG. 2A, in one embodiment, the second protective cover 50 defines a planar sheet of protective material. The second protective cover 50 is substantially similar in configuration to the first protective cover 40 and generally has features and aspects complementary to the first protective cover 40, such that the first protective cover 40 can be worn on a left leg of livestock and the second protective cover can be worn on a right leg of the same livestock.

More particularly, the second protective cover 50 has a lower portion 150, a central portion 160, and an upper portion 170. The lower portion 150 has a cuff 152 defining a lower end, and a first edge 154 and a second edge 156 defining non-parallel sides extending upward and outward from the cuff 152 toward the central portion 160 of the second cover 50. Similar to the first protective cover 40, in one embodiment, the first edge 154 comprises a surface having loop material, and the second edge 156 comprises a complementary surface with fastener material to fasten the edges 154, 156 to each other and to secure the second cover 50 to a livestock's leg.

The central portion 160 includes an extending segment 162, an indenting segment 164, and, in one embodiment, an elongated strap 166, as shown in FIG. 2. The upper portion 170 extends from the central portion 160. In one embodiment, the upper portion 170 comprises a first strap 174 and a second strap 176 at a terminal end 172 of the upper portion 170. As mentioned above, in one embodiment, inner surfaces 186, 188 of each strap 174, 176 (the inner surfaces are shown in FIG. 3) comprise a band of hook material for mating with straps 134, 136 of loop material on the first cover 40. The first strap 174 and the second strap 176 have outer surfaces 175, 177, respectively, as shown in FIG. 2A. FIG. 3A shows a bottom view of the protective garment 10 of FIG. 2A, including the first cover 40 and the second cover 50. It can be seen that the first protective cover 40 and the second protective cover 50 each has an inner surface defining a surface of the planar sheet that contacts the skin of livestock. The second edge 116 of the lower portion 110 of the first cover 40 comprises a hook material surface for mating with a corresponding loop material surface of the first edge 114. Similarly, the second edge 156 of the lower portion 150 of the second covering 50 defines a hook material surface for connection with a loop material surface of the first edge 154.

The other features, aspects, and elements of the protective garment 10 as described with connection to FIG. 2A apply equally with reference to FIG. 3A. Each remaining element with a reference numeral in FIG. 3A has been described hereinbefore in connection with FIG. 2A. Therefore, to avoid redundancy, the elements shown in FIG. 3A will not be described again.

In the illustrated embodiments, the attachment member 60 (comprising, for example, a first cover 40 having a first strap 134, a second strap 136, and an elongated strap 126, and a second cover 50 having a first strap 174, a second strap 176, and an elongated strap 166) comprises a separable hook and fastener material such as VELCRO. The attachment member 60, however, can comprise other fastening devices. For example, in some embodiments, the attachment member 60 comprises rope, buttons, adhesive bonding material, string, wire, clips, pins, elastic band material, straps, ties, and/or zippers. A person of ordinary skill in the art would recognize that other suitable fastening or attaching devices could be used to fasten a first garment to a second garment and to sufficiently cover livestock. In addition, as previously explained, in some embodiments, the garment 10 might not have an attachment member 60 at all.

FIGS. 2B and 3B show an embodiment of the protective garment 10 where the garment defines a single, one-piece protective cover 500. The protective cover 500 has a first portion 510 for covering a left side of a horse and a second portion for covering a right side of the horse 520. The first portion 510 and the second portion 520 are similar in structure and function to the first cover 40 and the second cover 50, as described above in connection with FIGS. 2A and 2B. The cover 500 has a connecting portion 530 that couples the first portion 510 to the second portion 520. When a horse wears the one-piece protective cover 500, the connecting portion 510 preferably is disposed on the horse's front chest.

The protective cover 500 has connecting edges 540, 542 and connecting straps 544, 546 on the first portion 510 for securing the cover 500 about a horse's front left leg. Similarly, the cover 500 has connecting edges 550, 552 and connecting straps 554, 556 for securing the cover 500 about a horse's front right leg. In addition, the cover 500 has connecting member and straps 560, 562, 564, 566 for securing the cover 500 about a horse's back and lower neck. The connecting pieces can be similar to the attaching portions and straps as described above in connection with FIGS. 2A and 3A.

Figure 4A:
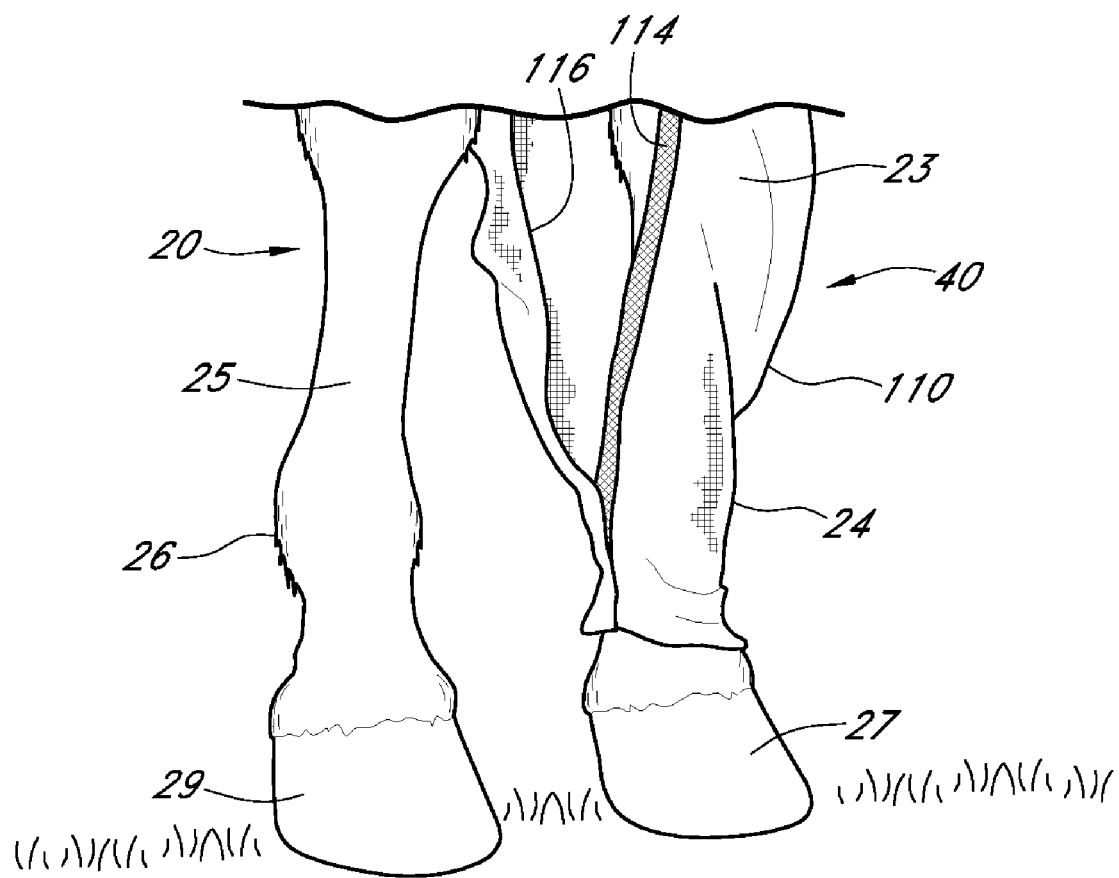
FIG. 4A is a perspective view of a portion of a protective garment illustrating a lower end of a lower portion of the protective garment being partially attached near a hoof of a horse.
Figure 4B:
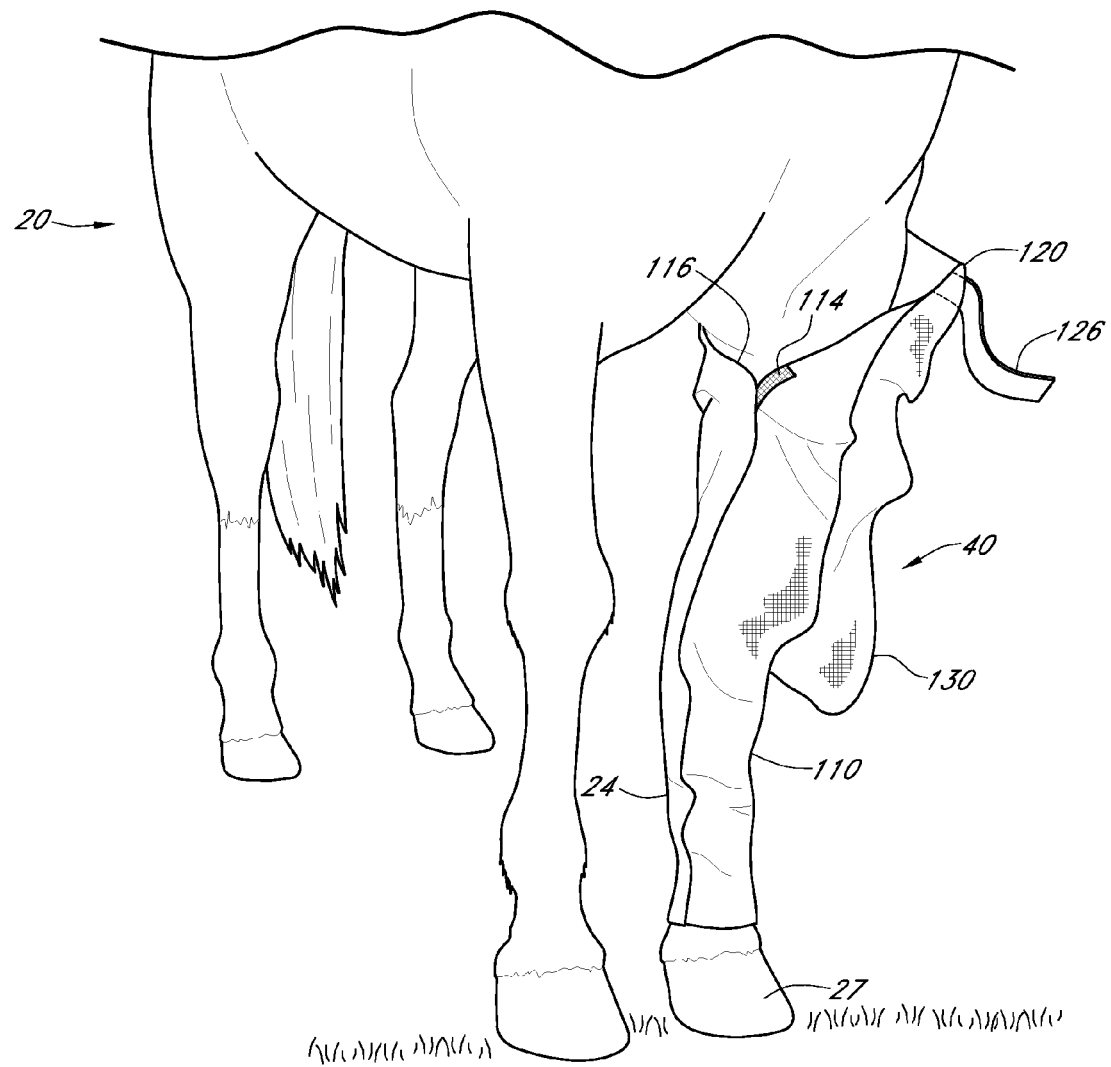
FIG. 4B is a perspective view of a protective garment as illustrated in FIG. 4A, further showing a lower portion of the protective garment being substantially attached from near a hoof to an upper portion of a leg of a horse.
Figure 4C:
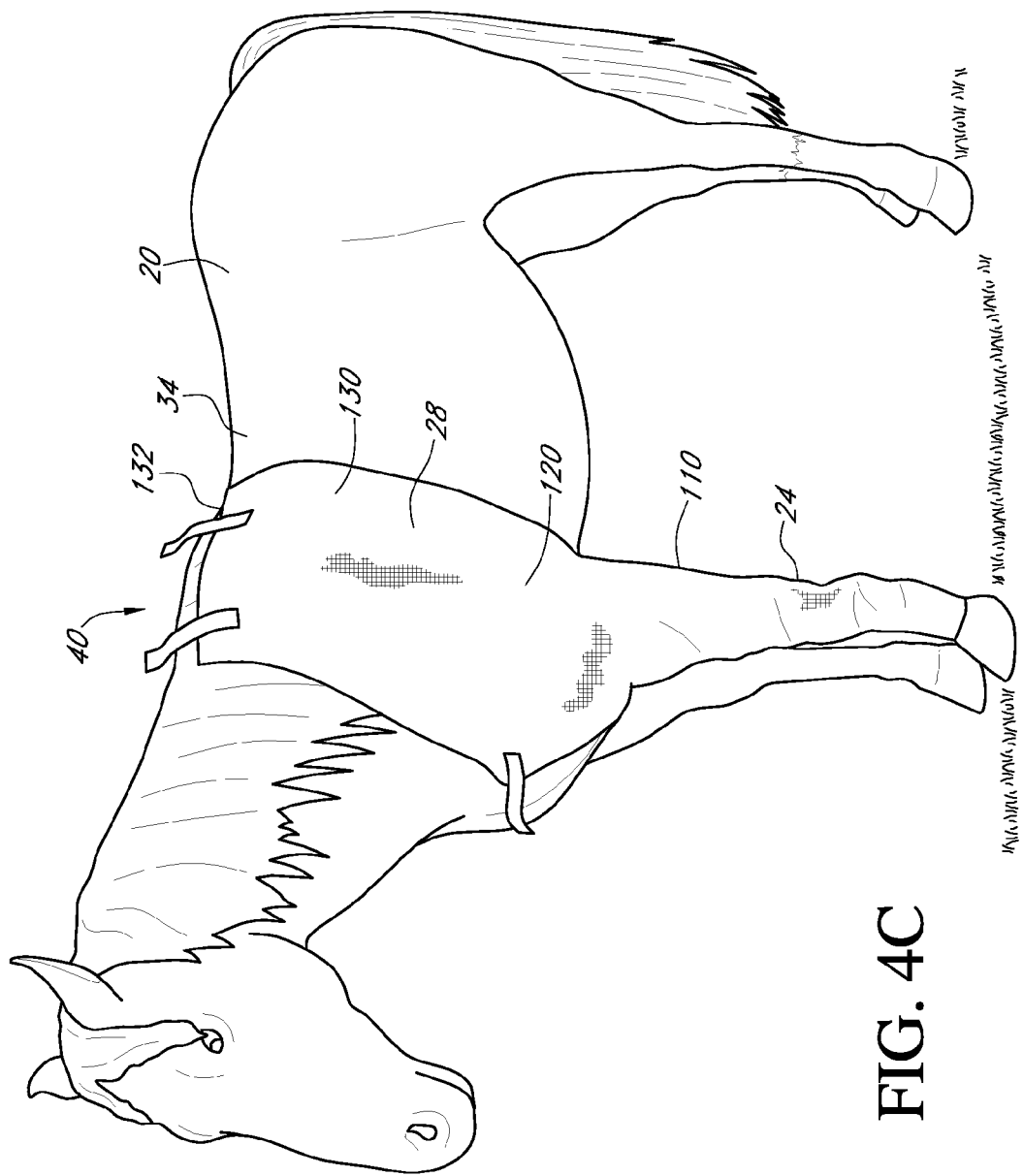
FIG. 4C is a perspective view of a protective garment as illustrated in FIGS. 4A and 4B, further showing the protective garment substantially covering a leg and a shoulder of a horse.
Figure 5:
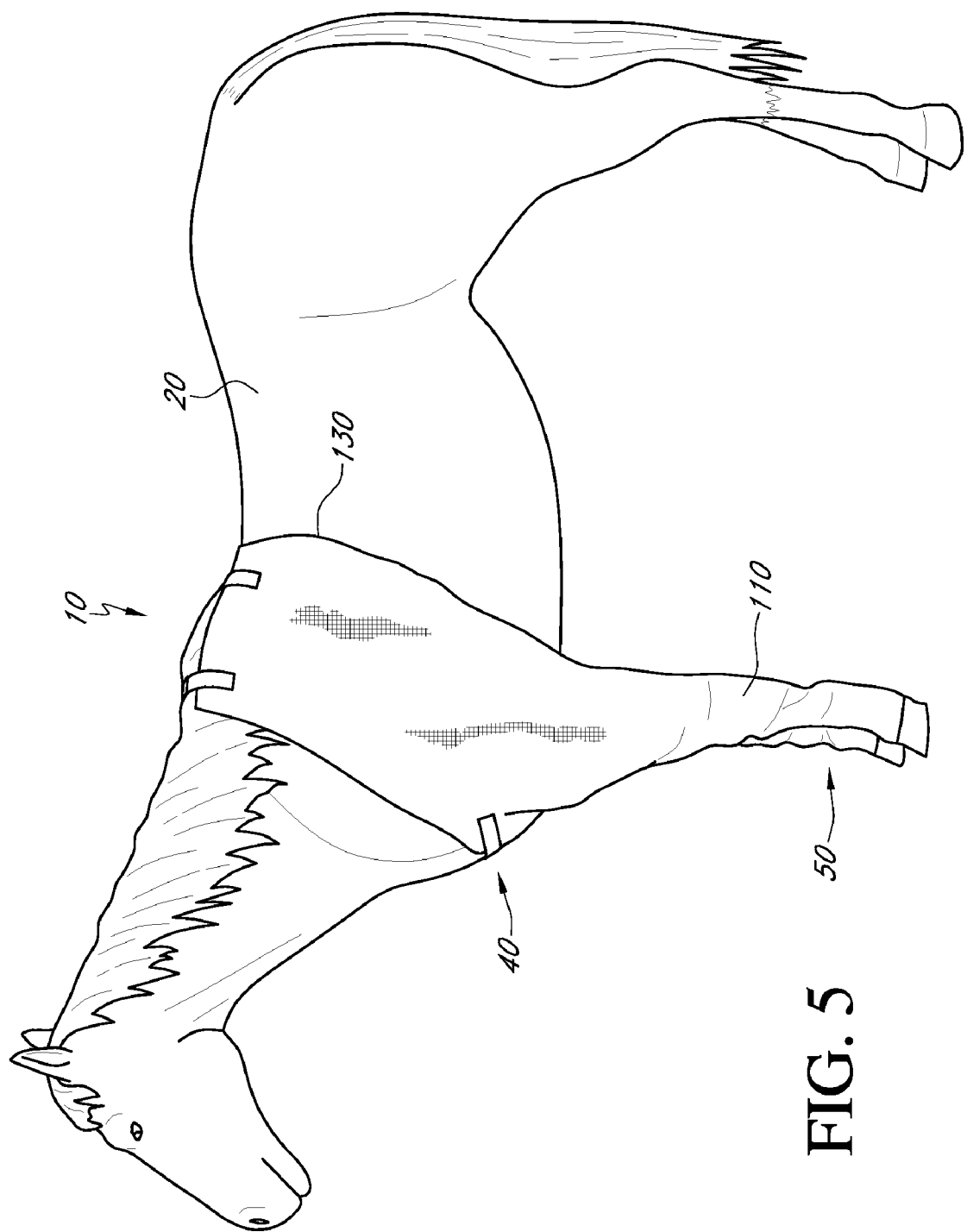
FIG. 5 is a left side elevation view of a horse wearing an embodiment of a protective garment.

FIGS. 4A through 4C illustrate a process for dressing livestock, such as a horse, with a protective garment. Those figures show, in particular, dressing a front left portion of a horse 10 with a first cover 40 of a protective garment 10. It is contemplated that dressing other portions of livestock, such as a front right portion, a rear left portion, and a rear right portion would be carried out in a similar manner.

In FIG. 4A, a lower portion 23 of a left leg 24 and a lower portion 25 of a right leg 26 of a horse 20 are shown. A portion of a first cover 40 is shown partially covering the left leg 24 near a left hoof 27. A portion of the first edge 114 (comprising, in one embodiment, a loop material) of the lower portion 110 of the first cover 40 is fastened to a portion of the second edge 116 (comprising, in one embodiment, a hook material) of the lower portion 110 of the first cover 40. Other portions of the first edge 114 and the second 116, generally disposed above the fastened portions extending upward along the left leg 24 of the horse 20, are shown in an unattached configuration.

FIG. 4B shows the first cover 40 covering most of the left leg 24 of the horse 20 from its hoof 27 to near an underbody of the horse 20. The first edge 114 and the second edge 116 of the lower portion 110 are fastened to each other to substantially cover the outer surface of the left leg 24 to protect the horse 20 from undesirable external elements, such as insects and sunlight. The central portion 120 of the first cover 40 is shown draped to a side of the horse 20. The elongated strap 126 is connected to the central portion 126, and extends outward therefrom, for fastening the first cover 40 to another protective garment near a front portion of the horse 20. The upper portion 130 of the first cover is shown extending downward from the central portion 120 toward a ground surface.

As illustrated, the first cover 40 comprising a planar sheet of material can be secured to a horse 20 in an easy and efficient manner. One simply wraps either a first edge 114 or a second edge 116 about the horse's leg until the first edge 114 mates with the second edge 116. Then, one can press the first edge and the second edge together to create an attached and fastened configuration of the first cover 40. As explained above, however, other suitable fastening mechanisms might be used. Advantageously, as shown in FIG. 4A, the first cover 40 can be fastened about a horse's leg without lifting the horse's leg or hoof from a ground surface, thereby reducing the potential danger of the horse kicking a person who is dressing the horse.

FIG. 4C illustrates the first cover 40 of the protective garment 10 covering a left side of a horse 20. After the first edge 114 and the second edge 116 are attached to each other to allow the cover 40 to substantially surround the left leg 24, the central portion 120 and the upper portion 130 of the cover 40 are pulled upward and positioned about a front left shoulder 28 of the horse 20. The central and upper portions 120, 130 preferably substantially cover the front left shoulder 28. The central portion 120 also preferably covers at least a portion of an underside and front chest of the horse 20. The upper portion 130 extends to cover at least a portion of the back 34 of the horse 20. In sum, FIGS. 4A through 4C show one method for dressing livestock, such as a horse, with a protective garment 10 comprising a first cover 40.

With reference to FIG. 5, a left side view of a horse 20 wearing the protective garment 10 is illustrated. The lower portion 110 of the first protective cover 40 covers substantially all of the front left leg of the horse. In the illustrated embodiment, the upper portion 130 of the first cover 40 extends from a lower part of the horse's body, across a left shoulder, and to a portion of the horse's back. The second protective cover 50 is almost entirely hidden from view in FIG. 5; however, a portion of the second cover 50 is shown on a front right leg of the horse.

In one embodiment, the upper portion 130 covers substantially all of a left shoulder of the horse. The skin covering and adjacent to a horse's shoulder typically is relatively soft and somewhat sensitive. Therefore, the upper portion 130 advantageously protects this area of the horse from threatening external elements, such as mosquitoes, ticks, and direct sunlight, that would otherwise cause particular irritation or harm to such a region of the horse. As a result, the protective garment 10 is particularly suited for protecting horses from insects and sunlight because other livestock, such as cows, might not have such a sensitive shoulder and upper body region, as cow hide is generally much tougher than horse skin in this particular region.

Figure 6A:
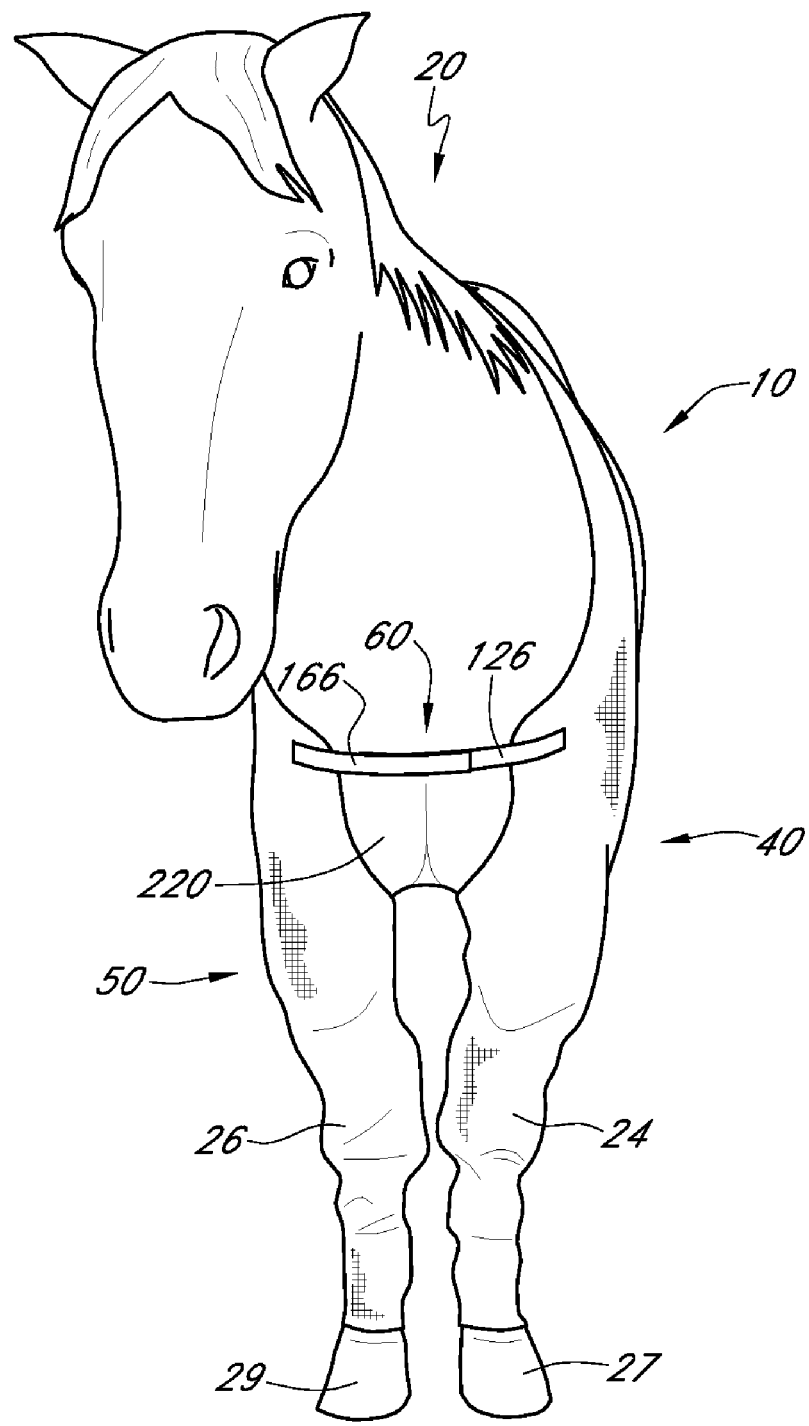
FIG. 6A is a front elevation view of a horse wearing an embodiment of a protective garment defining an open region on a front portion of a horse.
Figure 6B:
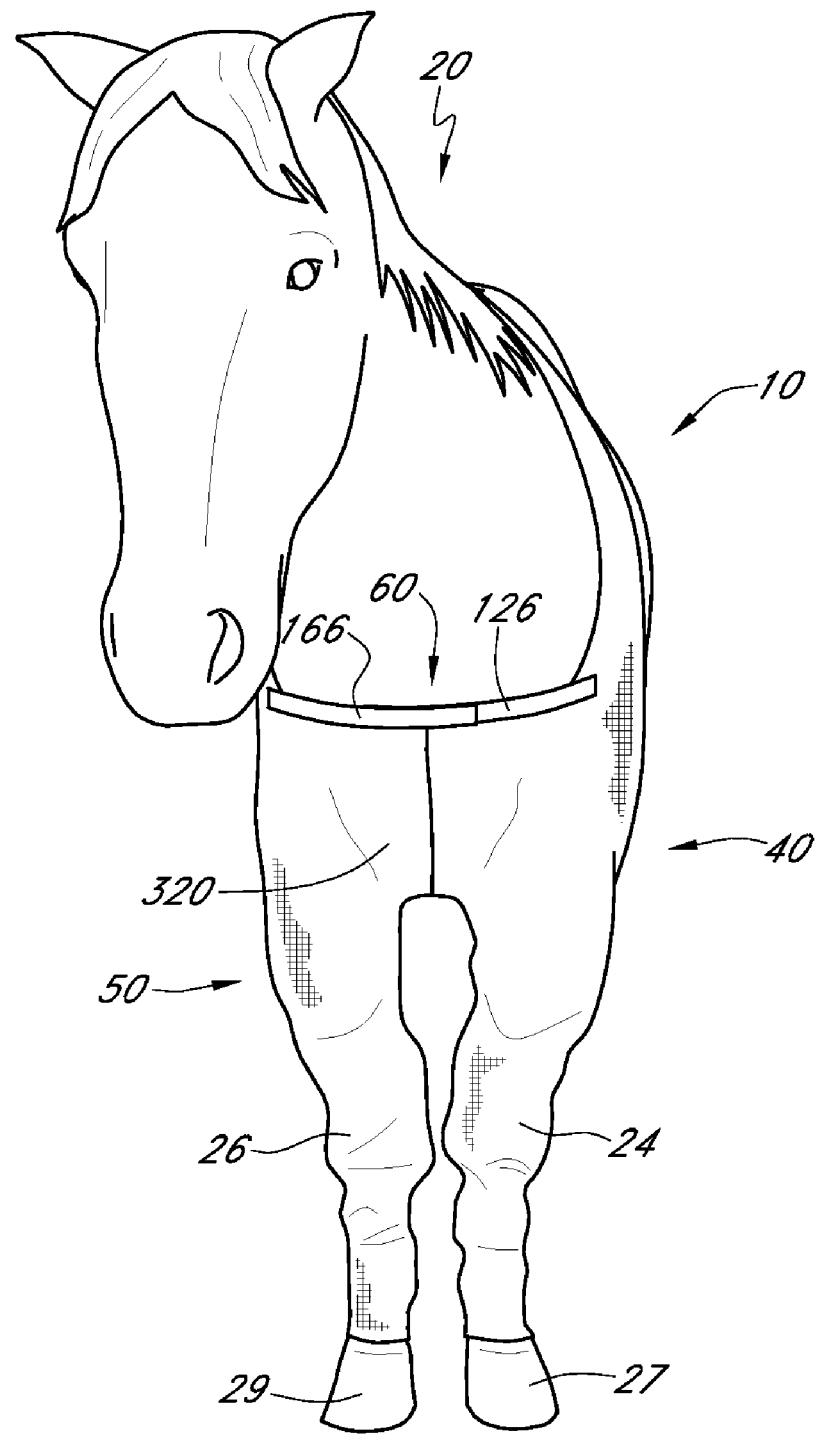
FIG. 6B is a front elevation view of a horse wearing an embodiment of a protective garment defining a closed region on a front portion of a horse.
Figure 6C:
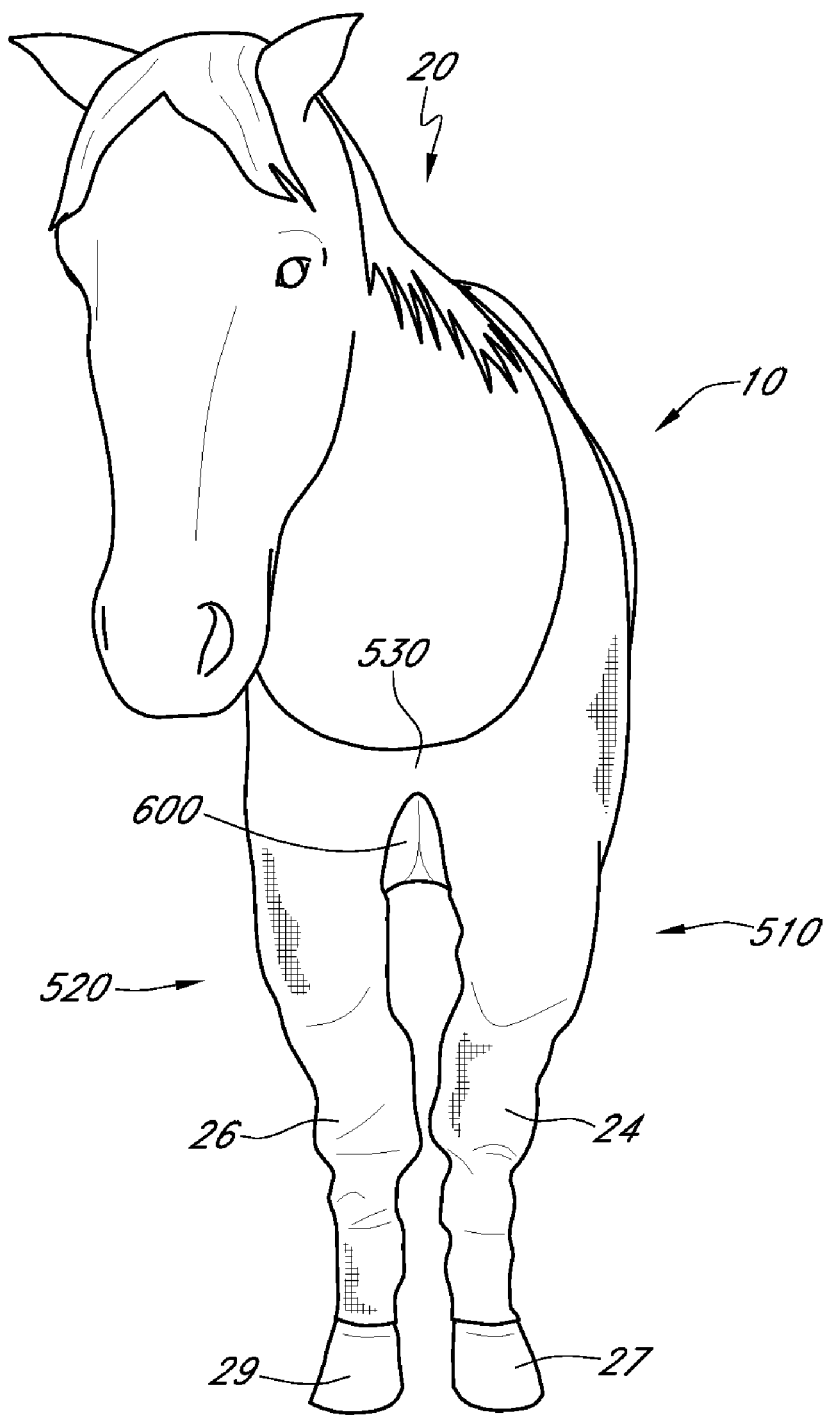
FIG. 6C is a front elevation view of a horse wearing an embodiment of a protective garment as shown in FIGS. 2B and 3B.

FIGS. 6A through 6C show a front view of a horse 20 wearing the protective garment 10. As shown in FIGS. 6A and 6B, the first protective cover 40 and the second protective cover 50 extend upward from left and right hooves 27, 29 about left and right front legs 24, 26. In one embodiment, an attachment member 60 is provided such that the elongated strap 166 of the second cover 50 mates with the elongated strap 126 of the first cover 40 to secure the garment 10 to a front breast of the horse, preferably below the horse's neck.

In one embodiment, as shown in FIG. 6A, the garment 10 defines an open region 220 where upper leg portions of first protective cover 40 and second protective cover 50 meet. Such an open configuration enhances a horse's ability to move while wearing the garment 10. In another embodiment, as illustrated in FIG. 6B, the garment 10 defines a closed region 320 where upper leg portions of first protective cover 40 and second protective cover 50 meet. The closed region 320 of the garment 10 provides the skin on a front portion of the horse 20 protection from insects and the like. That region of a horse's skin (e.g., the front breast below the neck), in some cases, is particularly sensitive to harmful external elements such as insects.

As seen in FIGS. 6A and 6B, in one embodiment, the protective garment 10 is somewhat loose, thereby enabling a horse 20 to move freely while wearing the garment 10. In particular, the horse 20 preferably can freely perform any natural gait, including, but not limited to, walking, trotting or jogging, catering or loping, and galloping, without undue interference from the garment 10. The garment 10, however, is tight and secure enough so that the garment 10 adequately protects the horse from external elements and it does not unduly snag or get caught on common objects, such as fences and shrubbery. If the protective garment 10 were to catch on a fence or the like, however, the hook and loop fastening features of the first and second covers 40, 50 advantageously allow the protective garment 10 to rip loose from the fence or the like.

FIG. 6C illustrates a one-piece protective garment, as previously described in connection with FIGS. 2B and 3B. The first portion 510 and the second portion 520 of the garment 500 extend upward from left and right hooves 27, 29 about left and right front legs 24, 26. The connecting portion 530 extends across a front breast of the horse, preferably below the horse's neck, to connect the first portion 510 and the second portion 520. In one embodiment, the connecting portion 530 defines an open region 600 where upper leg portions of the first garment portion 510 and the second garment portion 520 meet. As with the embodiment illustrated in FIG. 6A, such an open configuration enhances a horse's ability to move while wearing the garment 10.

FIG. 7 illustrates a top plan view of a horse 20 wearing an embodiment of the garment 10 comprising a first cover 40 and a second cover 50. The upper portions 130, 170 of the first and second covers 40, 50, respectively, cover at least a portion of the horse's back 34. As shown, a first strap 134 of the first cover 40 mates with a first strap 174 of the second cover 50 near a back portion of the horse. A second strap 136 of the first cover 40 similarly mates with a second strap 176 of the second cover 50 near a rear neck portion. The second straps 136, 176, however, mate with each other at a position on the horse's neck and back further forward than the position where the first straps 134, 174 mate. That is, a measurable distance D exists between the first straps 134, 174 and the second straps 136, 176. The distance D between the connections of the straps allows the straps to be disposed on either side of shoulder blades of the horse. Advantageously, this arrangement further secures the garment 10 to the horse 20 and allows the horse's shoulders and legs to move in a natural manner while the horse 20 is wearing the protective garment 10. Further, this arrangement also allows the fabric of the covers 40, 50 to move with respect to each other about a pivot point defined by the horse's shoulder as the horse is walking.

FIG. 8 illustrates another embodiment of a garment 400 which comprises a front set of covers 410 and a rear set of covers 420. The front set of covers 410 substantially covers a front portion of a horse, including its front legs and front shoulders. The front set of covers 410 are similar in structure and design to the first cover 40 and the second cover 50, as illustrated and described above with reference to FIGS. 1 through 7. The rear set of covers 420 substantially covers a rear portion of a horse, including its rear legs and rear quarters between its back and tail.

The rear set of covers 420 preferably comprises a first cover 430 for covering a left side and a second cover 440 for covering a right side of the horse. In one embodiment, the rear set of covers 420 has connection members 450, 452 that extend from the first cover 430 to the second cover 440. Similar to the protective garment 10 illustrated above in FIGS. 1 through 7, the rear set of covers 420 is configured to be securely attached to the horse while allowing the horse sufficient flexibility so that the horse can naturally move without obstruction.

Although the protective garments have been disclosed in the context of certain embodiments and examples, it will be understood by those skilled in the art that the present protective garment for livestock extends beyond the specifically disclosed embodiments to other alternative embodiments and/or uses of the garment and obvious modifications and equivalents thereof. For example, as indicated above, the garment can be used to protect livestock other than horses. In addition, while a number of variations of the protective garments have been shown and described, other modifications, which are within the scope of the embodiments, will be readily apparent to those of skill in the art based upon this disclosure.

It is also contemplated that various combinations or subcombinations of the specific features and aspects of the embodiments may be made and still fall within the scope of the embodiments. For example, an attachment member, if used at all, might be used to attach a first protective cover and a second protective cover in locations other than across a back of the livestock. The attachment member, for instance, might be disposed behind the livestock, in front of the livestock, underneath the livestock, or elsewhere. Accordingly, it should be understood that various features and aspects of the disclosed embodiments can be combined with or substituted for one another in order to form varying modes of the disclosed protective garments.

What is claimed is:

1. A garment for a horse to protect the horse from undesirable external elements including insects and sunlight, the garment comprising:
    a first portion formed of only a single layer porous fabric mesh having a lower portion and an upper portion, the lower portion configured to cover substantially all of a first leg of the horse, the upper portion configured to cover at least a substantial portion of a first shoulder of the horse;
    a second portion formed of only a single layer porous fabric mesh having a lower portion and an upper portion, the lower portion configured to cover substantially all of a second leg of the horse, the upper portion configured to cover at least a substantial portion of a second shoulder of the horse; and
    an attachment member having a first end and a second end, the first end attached to the first portion and the second end attached to the second portion, wherein the attachment member connects the first portion to the second portion such that the horse can freely move while the first portion and the second portion securely cover the horse to protect the horse from insects and sunlight, wherein the attachment member comprises a first elongated strap and a second elongated strap extending from a terminal end of the first portion, a third elongated strap and a fourth elongated strap extending from a terminal end of the second portion, wherein the first elongated strap is configured to connect to the third elongated strap to define a first connection on one side of at least one of the first and second shoulders of the horse and the second elongated strap is configured to connect to the fourth elongated strap to define a second connection on another side of at least one of the first and second shoulders such that the first connection and the second connection are separated by a longitudinal distance wherein the distance is defined by at least one of the first and second shoulders of the horse and is selected so that the fabric mesh of the first and second portions move with respect to each other about a pivot point defined by the horse's shoulder as the horse is walking.

2. The garment of claim 1, wherein the garment comprises a two-piece protective cover such that the first portion comprises a first protective cover and the second portion comprises a second protective cover.

3. The garment of claim 1, wherein the attachment member is disposed about a back of the horse.

4. The garment of claim 1, wherein the upper portion of the first portion extends from an upper portion of the leg of the horse across the shoulder of the horse and covers at least a portion of a back of the horse.

5. The garment of claim 1, wherein the upper portion of the first portion has a generally rectangular configuration.

6. The garment of claim 1, wherein the first portion is sized and shaped to be secured to the horse to cover substantially all of a leg of the horse without requiring the horse to lift a hoof from a ground surface.

7. The garment of claim 1, wherein the first portion comprises a planar sheet of material.

8. The garment of claim 1, wherein the lower portion of the first portion comprises a first edge and a second edge, such that the first edge is configured to attach to the second edge to enable the first portion to substantially cover the leg of the horse and the first edge is configured to detach from the second edge to remove the first portion from the horse.

9. A protective garment for a horse, the protective garment comprising:
- a first single layer planar sheet of porous fabric mesh material having a first and a second surface dimensioned to substantially cover a leg and a shoulder of a horse, wherein a first portion of the planar sheet defines a first edge attaches to and detaches from a second edge of a second portion of the planar sheet substantially continuously along the first and second edges using hook and loop fastener that extend substantially along the length of the leg of the horse to facilitate dressing the horse with the planar sheet and to facilitate removing the sheet from the horse wherein the first surface of the sheet touches the skin of the horse and the second surface of the sheet is exposed;
- a second single layer planar sheet of porous fabric mesh material having a first and a second surface dimensioned to substantially cover a leg and a shoulder of a horse, wherein a first portion of the planar sheet defines a first edge attaches to and detaches from a second edge of a second portion of the planar sheet substantially continuously along the first and second edges using hook and loop fastener that extend substantially along the length of the leg of the horse to facilitate dressing the horse with the planar sheet and to facilitate removing the sheet from the horse wherein the first surface of the sheet touches the skin of the horse and the second surface of the sheet is exposed; and;
- an attachment member extending from one of the first sheet and the second sheet and dimensioned to attach to and detach from the other of the first sheet and the second sheet such that the planar sheet securely covers an outer surface of the horse.

10. The protective garment of claim 9 wherein the first edge and the second edge are substantially linear.

* * * * *